United States Patent [19]

Habenicht et al.

[11] Patent Number: 5,387,172
[45] Date of Patent: Feb. 7, 1995

[54] FIBER-REINFORCED PLASTIC CYLINDER WITH AN OUTER WEAR-RESISTANT LAYER OF FILLER-CONTAINING PLASTIC AND A METHOD FOR PRODUCING THE SAME

[75] Inventors: Hinrich Habenicht, Gersthofen; Bernd Wohletz, Meitingen, both of Germany

[73] Assignee: Sigri Great Lakes Carbon GmbH, Meitingen, Germany

[21] Appl. No.: 106,136

[22] Filed: Aug. 13, 1993

[30] Foreign Application Priority Data

Aug. 13, 1992 [DE] Germany .................. 4226789

[51] Int. Cl.⁶ .................................... B23P 15/00
[52] U.S. Cl. ................................ 492/50; 492/52; 492/54; 492/56
[58] Field of Search ............... 492/54, 56, 47, 26, 492/50, 52; 162/287; 428/906

[56] References Cited

U.S. PATENT DOCUMENTS

| 3,707,752 | 1/1973 | Brafford et al. | |
| 3,775,208 | 11/1978 | Grigoleit et al. | |
| 4,078,286 | 3/1978 | Takiguichi et al. | 492/56 |
| 4,257,699 | 3/1981 | Lentz | 492/56 |
| 4,586,224 | 6/1986 | Sartor et al. | |
| 4,838,942 | 6/1989 | Puchinger et al. | |
| 4,859,506 | 8/1989 | Puchinger et al. | |
| 5,111,567 | 5/1992 | Leino et al. | 492/56 |
| 5,123,151 | 6/1992 | Uehara et al. | 492/56 |
| 5,153,660 | 10/1992 | Goto | 492/56 |
| 5,253,027 | 10/1993 | Goto | 492/56 |
| 5,292,606 | 3/1994 | Fitzgerald | 492/56 |

FOREIGN PATENT DOCUMENTS

| 0241927 | 10/1987 | European Pat. Off. | |
| 0273298 | 7/1988 | European Pat. Off. | |
| 0375914 | 7/1990 | European Pat. Off. | |
| 8322639 | 1/1984 | Germany . | |
| 8406019 | 5/1984 | Germany . | |
| 3613060 | 10/1987 | Germany . | |
| 3715894 | 11/1988 | Germany . | |
| 3527912 | 12/1989 | Germany . | |
| 3844290 | 12/1989 | Germany . | |
| 538549 | 8/1973 | Switzerland . | |
| 887366 | 1/1962 | United Kingdom . | |
| 2169381 | 7/1986 | United Kingdom | 492/54 |

Primary Examiner—Irene Cuda
Attorney, Agent, or Firm—Herber L. Lerner; Laurence A. Greenberg

[57] ABSTRACT

A cylinder or roller for paper, plastic or material webs is formed of a plastic material reinforced with fibers and is used for the purpose of transporting, deflecting or web guiding. Instead of a layer covering the casing and being applied with an electrolytic method or by a thermal spraying method, an abrasion-resistant layer of a synthetic resin and a filler of a powder of abrasion-resistant material is used.

16 Claims, 2 Drawing Sheets

FIBER-REINFORCED PLASTIC CYLINDER WITH AN OUTER WEAR-RESISTANT LAYER OF FILLER-CONTAINING PLASTIC AND A METHOD FOR PRODUCING THE SAME

BACKGROUND OF THE INVENTION

FIELD OF THE INVENTION

The invention relates to a cylinder or roller having a base body formed of fiber-reinforced plastic and a wear-resistant layer at least partially covering the outer roller surface or casing. The invention also relates to a method for producing such a cylinder or roller. The invention relates in particular to rollers or cylinders of the indicated type for the purpose of web guiding and deflecting, for transporting or for rolling and unrolling webs of paper, film or material.

When manufacturing and processing paper, plastics or other materials in the form of webs, cylinders of metal or of plastic reinforced with fibers are used today for transporting, guiding, deflecting and rolling or unrolling. Metallic cylinders can be produced with high precision at comparatively reasonable cost. The surface thereof can easily be adapted to the respective requirements with regard to surface roughness, surface hardness, and abrasion or corrosion behavior. The disadvantage of that type of cylinder lies in its large mass and therefore its inertia. As a result, metal cylinders are subjected to high centrifugal forces with the danger of deformation or unsteady operation, the driving forces are comparatively high and high demands are made on the mechanical balance. Moreover, the large mass of such cylinders has to be considered in the structural planing of the machines and installations, and results in correspondingly heavy and therefore expensive frame, bearing and drive structures. Cylinders that are formed of plastic reinforced with fibers, especially carbon fibers, do not have those drawbacks. Such cylinders, as compared with metal cylinders with an identical bending resistance, improved retention of shape and good resistance to corrosion, have a substantially smaller mass, which offers substantial advantages in the dynamic characteristics and in the configuration of the installation (see German Petty Patent DE-GM 83 22 639, corresponding to U.S. Pat. No. 4,586,224). A substantial disadvantage of fiber-reinforced plastic cylinders is their low resistance to abrasion. In order to overcome that problem, methods for coating the surfaces of such cylinders have been developed, with the aid of which it has been possible for single or multi-layered metallic or even ceramic coatings to be produced on the outer surface of the cylinders, which met the demands of competitive metallic cylinders with regard to the resistance to abrasion in combination with other surface properties, e.g. roughness, structure or electric conductivity. In order to apply such suitable coatings, in addition to electrolytic methods (as in German Petty Patent DE-GM 84 06 019.0), thermal spraying methods such as plasma spraying or flame-spraying, have been used almost exclusively. Such methods are found in British Patent No. 887 366; Swiss Patent CH 538 549, corresponding to U.S. Pat. No. 3,775,208; German Patent DE 35 27 912 C2; or German Patent DE 38 44 290 C1, corresponding to Published European Application No. 0 375 914 A1. All of the coatings according to those methods require high expenditure, but nevertheless the bond strength and impact resistance of the coated layers are often not completely satisfactory. In addition, those circumstances have resulted in the use of fiber-reinforced cylinders, which are desirable per se, but have not yet found an opening in industrial technology to the extent that would be expected because of the excellent weight related mechanical strength properties of that advanced cylinder material.

SUMMARY OF THE INVENTION

It is accordingly an object of the invention to provide a plastic cylinder reinforced with fibers, particularly with glass or carbon fibers, having an outer wear-resistant layer of filler-containing plastic, and a method for producing the same, which overcome the hereinafore-mentioned disadvantages of the heretofore-known devices and methods of this general type and which fully retain the good material-specific properties of cylinders or rollers of fiber-reinforced plastic, while having an abrasion-resistant surface coating which is free from cracks, is not susceptible to chipping, is sufficiently resistant to corrosion and, in comparison with the heretofore common surface coatings, can be produced with low expenditure. A further object is to ensure that the method for producing such a cylinder or roller is efficient and reasonably priced.

With the foregoing and other objects in view there is provided, in accordance with the invention, a cylinder or roller, comprising a base body of fiber-reinforced plastic having an outer roller surface; and a wear-resistant layer at least partially covering and adhering to the outer roller surface in an undetachable manner; the wear-resistant layer being formed of a mixture of a synthetic resin and 20 to 70% by volume of a wear-resistant pulverized filler, relative to the total mixture in a hardened state.

An erosion-resistant, varnish-formed coating of plastic substances is known from Published European Application No. 0 273 298 A2, corresponding to U.S. Pat. Nos. 4,838,942 and 4,859,506. The coating therein is produced from a binder being formed of $CrO_3$, $H_3PO_4$, $H_3PO_3$ and $AlPO_4$, to which is added aluminum or titanium powder, that is applied to the plastic surfaces and annealed at a temperature which corresponds to the hardening temperature of heat-hardening epoxide resins. A disadvantage of that method is the necessity for working with acids and the very poisonous $CrO_3$. Matching of the surface finish to various operational requirements is only possible within very narrow boundaries and the adhesion of the layer is not sufficient for application to very quickly-rotating cylinders and constant contact with the product. According to German Published, Non-Prosecuted Application DE 36 13 060 A1, corresponding to Published European Application No. 0 241 927 A1, a mixture of a synthetic resin bonding agent and a filler of silver-plated copper powder combined with graphite powder is used for producing an electrically conductive synthetic resin coating. The usual varnish coating method is used to apply the layer. The replacement of layers produced by means of expensive thermal spraying methods, which are sensitive to the formation of cracks and chipping, resistant to abrasion and stressed by dynamic forces, by a layer according to the invention, is not suggested therein.

In the field of fiber-reinforced plastic cylinders provided with surface layers which are resistant to abrasion, for the printing industry, the paper-processing or film-producing and film-processing industry, attempts have been made again and again to improve the layers applied in an electrolytic method or by thermal spraying methods with respect to their adhesion to the substrate and relative to the cohesion of several layers applied over each other for the purpose of achieving certain surface properties of the cylinder. Apparently, other possibilities of improving such a cylinder were considered unpromising. It was therefore very surprising when it was discovered that synthetic resins or synthetic resin solutions filled with a high proportion of abrasion-resistant powders could be processed, after application onto the surface of the cylinders or rollers, to form an adherent abrasion-resistant coating.

In accordance with another feature of the invention, the wear-resistant layer adhering in an undetachable manner to the base body of a fiber-reinforced synthetic resin, is formed of a hardened synthetic resin serving as a matrix for the filler and at the same time facilitating the adhesion to the base body, and of a pulverized filler of an abrasion-resistant material, embedded in a uniformly distributed manner in the matrix.

In accordance with a further feature of the invention, the matrix is formed of any thermoplastic or thermosetting synthetic resin which, possibly after adding a suitable solvent, can be processed like a varnish and which, after application and hardening, produces a coating that is inherently stable and accurate to size, even under dynamic operating conditions, i.e. with permanent stress through centrifugal forces in combination with zone-wise compressive stress. Reasonably priced thermoplastics of that type are PVC-organosols, for example. However, thermosetting resins such as epoxide resins, unsaturated polyester resins, furan resins, phenol formaldehyde resins or thermosetting methyl methacrylate resins are preferably used. Epoxide resins from the group of thermosetting resins have proven to be particularly advantageous.

In accordance with an added feature of the invention, the filler is formed of any abrasion-resistant material available in powder form. From the plurality of materials which one skilled in the art knows in such a case, the following oxides are given as examples: $Al_2O_3$, $SiO_2$, $TiO_2$, $Cr_2O_3$, $Zr_2O_3$, $Y_2O_3$, mixed oxides, in particular those of the spinell type, silicates, titanates, carbides, nitrides, borides or silicides of the transition metals titanium, zirconium, vanadium, chromium, molybdenum, tungsten, in particular silicon carbide, titanium carbide, tungsten carbide, chromium carbide, besides boron carbide, cubic boron nitride, aluminum nitride, carboboron nitride, silicon nitride, aluminum boride, silicon boride, boron or silicon and furthermore hard alloys of the elements, nickel, cobalt, iron, molybdenum, silicon, aluminum and boron. The hard materials can form the filler individually or in mixtures with each other. In order to produce a reasonably priced cylinder or roller, preferably the less expensive abrasive powders, e.g. $Al_2O_3$, $SiO_2$, $TiO_2$, $Cr_2O_3$ or products produced therefrom as well as SiC, boron carbide, spinells, silicates or hard alloys of transition metals, possibly with aluminum or boron as additional alloy components, are used. By selecting the suitable hard material powder or a corresponding powder mixture combined with the selection of a suitable matrix resin and filler filling ratio, as well as possibly a suitable surface aftertreatment, the properties of the wear-resistant layer can be adapted to the respective use.

In accordance with an additional feature of the invention, in order to give the wear-resistant layer the desired properties and to ensure the processibility of the synthetic resin/filler varnish, the grain size of the respective filler being used lies between 1 and 100 μm, and preferably between 5 and 70 μm. The filler is used in a quantity of from 20 to 70, and preferably of from 30 to 50% by volume, relative to the material being formed of filler and hardened synthetic resin. Quantities of less than 20% by volume are possible, but the surface properties of the matrix resin then show up too much and the intended effect does not take place. With the use of more than 70% by volume of filler, the material is heavier or not able to be processed at all and the hardened layer no longer has the required stability. The thickness of the wear-resistant layer adhering to the base body is at least 10 and at the most 2000 μm. Layer thicknesses of preferably 50 to 200 μm are used, since these can be produced in one working cycle including application and hardening. The production of thicker layers requires at least several intermediate application and hardening steps.

In accordance with yet another feature of the invention, the base body has the shape of a hollow cylinder, with a surface which is formed of reinforcing continuous fibers, or of planar structures like woven fabric, for example, linked to each other like a textile, and a matrix resin. The base bodies are produced according to methods known from the state of the art (see German Patent DE 35 27 912 C2 or German Published, Non-Prosecuted Application DE 37 15 894 A1), for example by wrapping or coating a mandrel with fibers or woven fabric soaked with matrix resin, taking into consideration specific fiber orientations up to a desired layer thickness, hardening of the wound body and removal from the mandrel. The type of fiber preferably-used therein for the purpose of reinforcing is carbon fiber, because of its low weight combined with a high stability and rigidity. The term carbon fiber in that context also includes graphite fibers. Other known fibers can also be used for reinforcement, in particular glass fibers or polyarylamide fibers. The matrix of the base body can be formed of any suitable synthetic resin, with thermosetting synthetic resins being preferred. A pore-free layer that adheres particularly well to the base body and is moreover dense, in which layer the filler components are firmly bonded, is obtained when using epoxide resins for the matrix of the base body and for the matrix of the coating located thereon. Naturally, abrasion-resistant layers according to the invention can also be applied to plastic cylinders which are not reinforced with fibers or to metal cylinders. However, such cylinders do not have the several substantial advantages of the cylinders according to the invention.

With the objects of the invention in view, there is also provided a method for producing a cylinder or roller formed of a base body of fiber-reinforced plastic and a wear-resistant layer, which comprises longitudinally axially centering a cylinder or roller of fiber-reinforced plastic being specially processed, shaped or worked with regard to its outer diameter to a specified starting dimension, clamping the centered cylinder or roller in a turning device equipped with a support, and then rotating the cylinder or roller; then spraying a layer of synthetic resin varnish onto a cylindrical surface of the cylinder or roller with a liquid spraying device secured to the support at a specified advance of the support and a specified speed of the cylinder or roller, with the layer at least partially covering the cylindrical surface, being from 20 to 200 μm thick and containing a dispersed form of a wear-resistant powder with a grain size of between 2 and 100 μm, in a quantity of 30 to 55% by volume, relative to a total material or mass to be sprayed on; further rotating the cylinder, while possibly evaporating the solvent contained in the applied layer, to at least partially solidify the varnish layer to a shape or dimensional stability; and then transferring the cylinder to a hardening device, which can possibly be heated, to harden the wear-resistant layer.

The production of the starting material for the application of the wear-resistant layer takes place in generally conventional ways by intensive mixing of the components specified according to the recipe. The mixture obtained is then applied to the outer casing surface of the base body by immersion, spreading-on, brushing-on, or spraying-on or by another method for applying a coat (of paint). Spraying on by means of an automatic machine controlled by way of automatic action and being formed substantially of a rotating device and a traversing support holding the spraying device, such as an airless spray pistol, has proven to be particularly efficient. The most advantageous consistency of the starting material for the respective method of application being selected is adjusted by adding a suitable solvent. After completion of the application, which can also be undertaken by the application of several layers lying over each other, the base body is rotated further until the solvent possibly found in the layer is largely evaporated and the layer is hardened to the extent that it retains its form. The coated body is then subjected to a treatment which results in complete hardening of the applied layer and a firm anchoring of the layer onto the base body. The type of treatment is selected according to the requirements of the synthetic resin being used. With thermosetting resins it is often a thermal treatment which runs according to a specified program. After hardening or final solidification, the surface of the layer being applied is conformed to the specified purpose in a known manner, by smoothing, polishing or roughening. For example, the surfaces of web-guiding cylinders are roughened in order to facilitate the escape of the air drawn-in with the material web between the cylinder and the material web.

Besides the advantages already described above, another advantage is that a cylinder according to the invention can be used again after its surface can no longer satisfy the set requirements due to corresponding use. In order to accomplish this, the old surface layer is removed, e.g. stripped off on a lathe and a new surface coating is applied to the newly prepared old base cylinder. This results in a further reduction of the operating costs for the cylinders according to the invention and has an environmental-friendly effect. Summarized, the invention has the following advantages:

While retaining the good mass-specific mechanical and particularly dynamic properties of a cylinder of fiber-reinforced plastic with an abrasion-resistant layer applied electrolytically or by a thermal spraying method, the production of the cylinder according to the invention is substantially cheaper, the abrasion-resistant layer adheres in an undetachable manner to the base body, does not tend to chip or form cracks, can easily be adapted to different operational requirements and it can be renewed after removal of a first used layer, by using the same base cylinder.

Other features which are considered as characteristic for the invention are set forth in the appended claims.

Although the invention is illustrated and described herein as embodied in a fiber-reinforced plastic cylinder with an outer wear-resistant layer of filler-containing plastic and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the examples given below and the accompanying drawings.

EXAMPLE 1

Preparation of the base cylinder:

A base cylinder of epoxide resin reinforced with carbon fibers, having an internal diameter of 90 mm, an external diameter of 100 mm, a length of 2000 mm, and which was built-up with C-fiber wrapping layers alternating with a 12° inclination relative to the vertical or perpendicular line, was clamped in a rotary lathe and ground at its periphery to 0.15 mm below the specified end diameter dimension. After careful blowing-off with compressed air that was free of oil mist, the base body was prepared for the coating process.

Production of the spraying solution:

| Recipe: | Parts by weight | % by vol. |
|---|---|---|
| Epoxide resin L20 (Bakelite) | 21.1 | 37.7 |
| Epoxide resin hardener SL (Bakelite) | 7.2 | 12.9 |
| Mixture or alloy of 97% by weight $Al_2O_3$ and 3% by weight $TiO_2$ (GTV No.40.01), Granulation 5 to 25 μm | 63.3* | 35.2 |
| Ethanol | 8.4 | 24.2 |

*this quantity corresponds to approximately 41% by volume filler, relative to the hardened layer.

The recipe components were mixed intensively with a turbostirrer, retaining a small proportion of ethanol and then adjusted by adding a further solvent to a viscosity which corresponded to an outflow time, from a viscosity cup according to DIN 53211, volume 100 ml, outlet nozzle 4 mm, of 42 DIN-sec..

In order to spray the liquid thus produced onto the base body, an automatically controllable wrapping and coating machine provided with a support was used. A liquid spraying device (a spray pistol of the Sata Jet type, manufactured by the firm Sata, Ludwigsburg, Germany) was secured to the support. After putting the machine into operation, an 80 μm thick layer was produced in the course of three passages of the spray tool over the base body, using the following spray parameters:

| | |
|---|---|
| spacing of spray nozzle-cylinder | 33 cm |
| Rotation of the base body | 150 $min^{-1}$ |
| Advance of the support | 10 cm · $min^{-1}$ |
| Diameter of the spray nozzle | 2.5 mm |
| Quantity of air, adjustment | maximum |
| Pressure | 4 bar |
| Quantity of material, adjustment | 3.2 |

After drawing-off air for approximately 10 minutes while undergoing rotation, the cylinder was taken from the coating device and the layer applied was hardened in a circulating drying chamber under the following conditions:

kept at room temperature for 24 hours
heated to 80° C. during 1 hour
holding time at 80° C. 15 hours
cooling to room temperature after disconnection of heating.

After removal from the drying chamber, the cylinder was ground slightly to obtain a smooth, sealed, faultless surface by rotation with an abrasive cloth (granulation 180) and thus rendered useable.

Another cylinder produced according to the same method was roughened, in addition, by sand-blasting with corundum, having a granulation 0.3 to 0.6 mm, for use as a web-guiding cylinder.

EXAMPLE 2

A surface layer corresponding to Example 1, finishing-variation 2, having a surface which was roughened, was produced in the following manner in a direct way.

A base cylinder that was produced as for Example 1 was stripped off with a diamond lathe tool to a diameter dimension which was smaller by 0.2 mm than the desired diameter dimension of the finished, coated cylinder, and then blown-off with oil-free compressed air. The spray solution was produced based on the following recipe, as was described for Example 1.

| Recipe: | Parts by weight | % by vol. |
|---|---|---|
| Epoxide resin L20 (Bakelite) | 17.4 | 31.1 |
| Epoxide resin hardener SL (Bakelite) | 5.9 | 10.6 |
| Mixture or alloy of 97% by weight $Al_2O_3$ and 3% by weight $TiO_2$ (GTV No.40.01), Granulation 5 to 25 μm | 70.0* | 39.0 |
| Ethanol | 6.7 | 19.3 |

* this quantity corresponds to approximately 48% by volume filler, relative to the hardened layer.

After mixing the recipe components, the viscosity corresponded to 100 DIN-sec. (DIN 53211).

The spraying of the spraying liquid thus produced took place on the same wrapping and coating machine as in Example 1, although under the following conditions:

| Spacing of the spray nozzle-cylinder | 47 cm |
|---|---|
| Rotation of the base body | 150 $min^{-1}$ |
| Advance of the support | 15 cm · $min^{-1}$ |
| Diameter of the spray nozzle | 2.5 mm |
| Quantity of air, adjustment | maximum |
| Pressure | 4 bar |
| Quantity of material, adjustment | 3.6 |

A layer 100 μm thick in all was applied in the course of five spraying passages over the base body, which gave a rough visual impression. After drawing-off air and hardening the applied layer, with both being carried out as for Example 1, the cylinder surface was rendered hydrophobic by spraying-on silicone resin. Without further processing steps, the cylinder produced in this way was suitable as a web-guiding cylinder for the oil paint operation of a roller printing press.

The adhesion of the layers according to the invention was tested by means of a pull-off or tear-off test. In none of the tests was the abrasion-resistant layer separated in the zone of connection to the base cylinder. De-laminations within the layer did not occur either.

DESCRIPTION OF THE PREFERRED EMBODIMENTS

Figure 1:
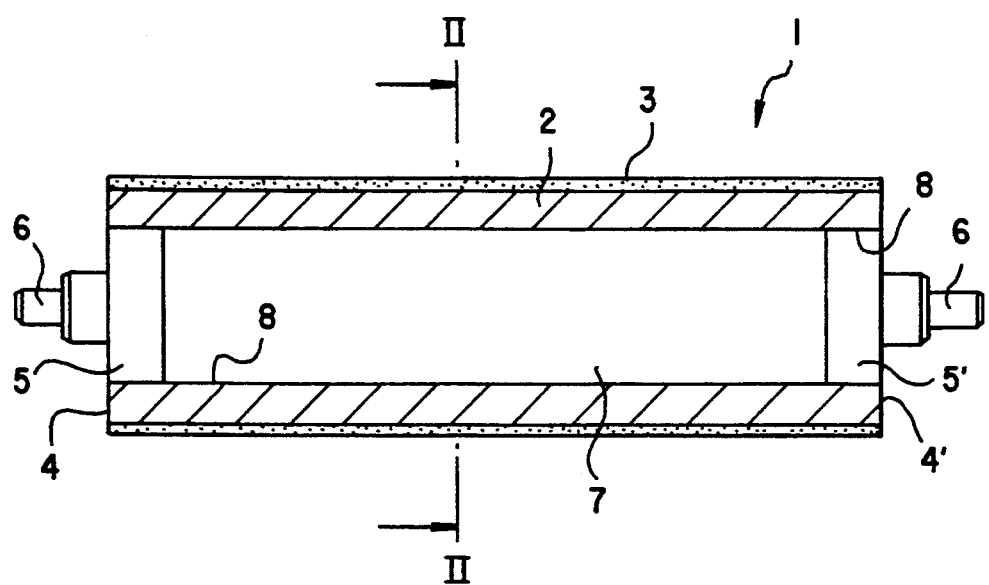
FIG. 1 is a diagrammatic, longitudinal-sectional view through the center axis of a coated roller.

Referring now to the figures of the drawing in detail and first, particularly, to FIG. 1 thereof, it is seen that a roller 1, which is shown diagrammatically and not to scale, includes an inner jacket 2 of carbon-fiber-reinforced resin, on which an outer layer 3 being formed of a resin matrix and an abrasion-proof filler and being applied by the method of the invention, adheres firmly. Receptacles 5, 5' for a pivot shaft 6 of the roller 1 engage the interior 7 of the roller 1 and are secured to its inner wall surface 8, at ends 4, 4' of the hollow-cylindrical roller 1.

Figure 2:
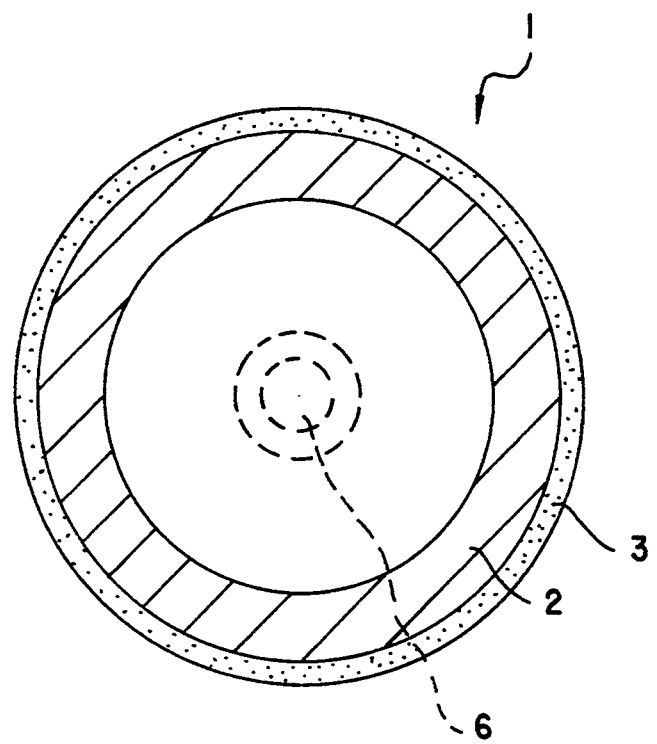
FIG. 2 is a cross-sectional view taken along the line II—II of the roller of FIG. 1, in the direction of the arrows.

In FIG. 2, the carbon-fiber-reinforced hollow-cylindrical inner jacket 2, with its resin matrix and with the abrasion-proof cover layer 3 according to the invention which is applied over the matrix, can be seen in cross section. The pivot shaft 6, which is not present in the plane of this cross section, is suggested by dashed lines.

Figure 3C:
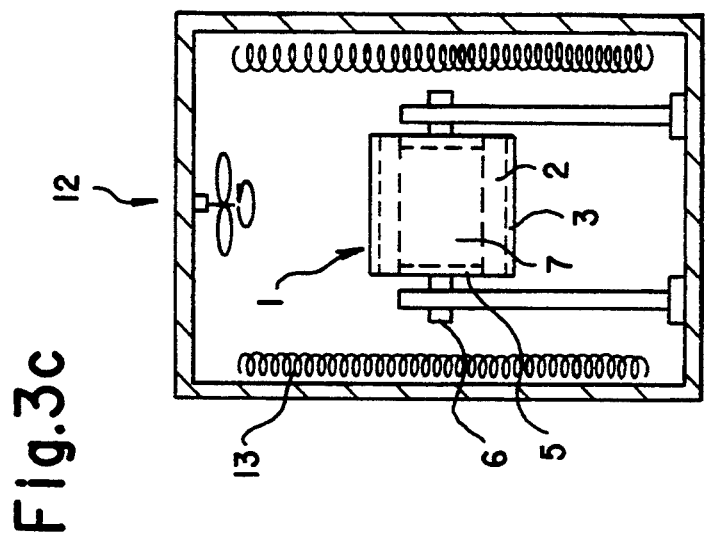
FIG. 3 is diagrammatic, sectional view showing the course of a process for producing a coating according to the invention.
Figure 3B:
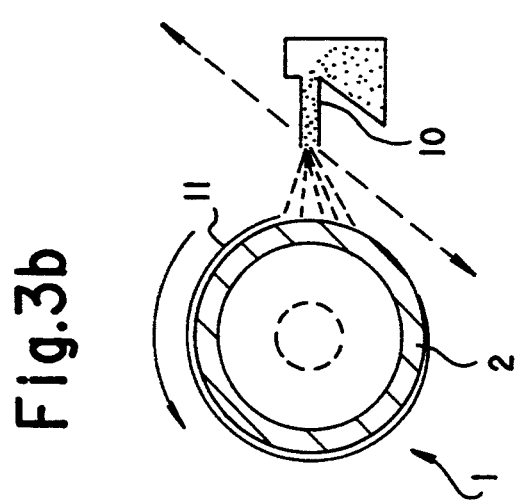
Figure 3A:
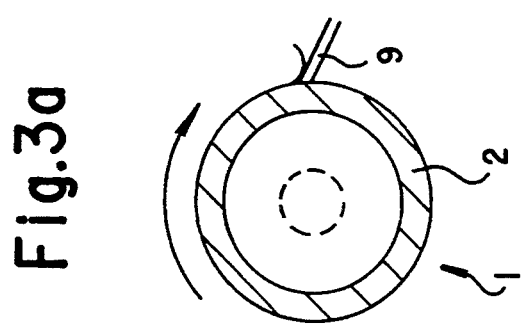

FIG. 3 is a diagrammatic illustration of the method for producing the roller or roll 1 from a base body of the inner jacket 2 of fiber-reinforced resin and the wear-resistant outer layer 3. In a first method step I, the hollow-cylindrical base body 2, which is produced by methods known in the prior art, is turned on a lathe (that is represented merely by an arrow indicating the direction of rotation of the base body 2 fastened on it and by a lathe chisel 9) until it attains the necessary nominal dimensions for the ensuing coating process. After the turned surface has then been blown clean with compressed air that is free of an oil mist, the surface of the base roller 2 is ready for the coating process in a method step II, which is likewise performed on a rotating device that is merely suggested by an arrow indicating the direction of rotation of the base roller 2. Through the use of a liquid or dye-spraying device 10, a resin layer 11 containing the abrasion-proof filler is sprayed onto the roller 2 that is rotating at a predetermined speed. The dashed double-headed arrow represents the fact that the spraying device 10 is secured to a traversing device that is not further shown but is familiar to anyone skilled in the art, and is moved horizontally back and forth in accordance with a predetermined program. After the resin layer 11 containing the filler has been sprayed on and after its surface has dried at least to the point of dimensional stability, the filler-containing resin layer 11 is cured in a method step III. This is performed in a heatable furnace 12, which is represented herein as a protective gas forced-air furnace that is heated by coils 13.

We claim:

1. A cylinder or roller, comprising:
   a base body of fiber-reinforced plastic having an outer roller surface; and a wear-resistant layer at least partially covering and adhering to the outer roller surface in an undetachable manner;

said wear-resistant layer being formed of a mixture of a synthetic resin and 20 to 70% by volume of a wear-resistant pulverized filler, relative to the total mixture in a hardened state.

2. The cylinder or roller according to claim 1, wherein said wear-resistant layer has a matrix formed of a hardenable synthetic resin selected from the group consisting of epoxide resin, unsaturated polyester resin, furan resin, phenol formaldehyde resin and thermosettingly hardening methyl methacrylate resin.

3. The cylinder or roller according to claim 1, wherein said filler is formed of at least one material selected from the group consisting of a ceramic material and a metallic material being resistant to abrasion.

4. The cylinder or roller according to claim 1, wherein said filler is formed of at least one ceramic material selected from the group consisting of $Al_2O_3$, $SiO_2$, $TiO_2$, $Cr_2O_3$, $Zr_2O_3$, silicon carbide, titanium carbide, tungsten carbide, chromium carbide, boron carbide, aluminum nitride, carboboron nitride, silicon nitride, aluminum boride, silicon boride, boron, silicon and cubic boron nitride.

5. The cylinder or roller according to claim 1, wherein said filler is formed of at least one reaction product of a material selected from the group consisting of MgO and of CaO with a material selected from the group consisting of $Al_2O_3$, $SiO_2$, $TiO_2$, $Cr_2O_3$, $Zr_2O_3$ in powder form.

6. The cylinder or roller according to claim 5, wherein said filler additionally has at least one pulverized ceramic material selected from the group consisting of $Al_2O_3$, $SiO_2$, $TiO_2$, $Cr_2O_3$, $Zr_2O_3$, silicon carbide, titanium carbide, tungsten carbide, chromium carbide, boron carbide, aluminum nitride, carboboron nitride, silicon nitride, aluminum boride, silicon boride, boron, silicon and cubic boron nitride.

7. The cylinder or roller according to claim 4, wherein said filler additionally contains at least one hard material alloy of at least two elements selected from the group consisting of Ni, Co, Mo, Si, Fe, Al and B, in powder form.

8. The cylinder or roller according to claim 5, wherein said filler additionally contains at least one hard material alloy of at least two elements selected from the group consisting of Ni, Co, Mo, Si, Fe, Al and B, in powder form.

9. The cylinder or roller according to claim 6, wherein said filler additionally contains at least one hard material alloy of at least two elements selected from the group consisting of Ni, Co, Mo, Si, Fe, Al and B, in powder form.

10. The cylinder or roller according to claim 1, wherein said filler is formed of at least one mechanically resistant alloy of at least two elements selected from the group consisting of Ni, Co, Mo, Si, Fe, Al and B, in powder form.

11. The cylinder or roller according to claim 1, wherein said wear-resistant layer has a thickness of between 10 and 2000 $\mu$m.

12. The cylinder or roller according to claim 1, wherein said filler has grains with a size between 1 and 100 $\mu$m.

13. The cylinder or roller according to claim 1, wherein said base body is formed of a plastic material reinforced with carbon fibers.

14. The cylinder or roller according to claim 1, wherein said base body is formed of a plastic material reinforced with glass fibers.

15. The cylinder or roller according to claim 1, wherein said base body and said wear-resistant layer each have a matrix formed of an epoxide resin.

16. The cylinder or roller according to claim 1, wherein said wear-resistant layer is lacquered on.

* * * * *